(12) United States Patent
Nyseth et al.

(10) Patent No.: US 6,988,460 B1
(45) Date of Patent: Jan. 24, 2006

(54) CRAB POT RACK FOR REMOVABLE INSTALLATION ON A BOAT

(76) Inventors: Richard L. Nyseth, 5000 Brickyard Rd., Tillamook, OR (US) 97141; James G. Nyseth, 21461 S. Highway 99W, Amity, OR (US) 97101

( * ) Notice: Subject to any disclaimer, the term of this patent is extended or adjusted under 35 U.S.C. 154(b) by 0 days.

(21) Appl. No.: 11/030,812

(22) Filed: Jan. 7, 2005

(51) Int. Cl.
*B63B 17/00* (2006.01)
(52) U.S. Cl. .................................................. 114/364
(58) Field of Classification Search ............... 114/364, 114/343
See application file for complete search history.

(56) References Cited

U.S. PATENT DOCUMENTS

| | | | | |
|---|---|---|---|---|
| 2,584,295 | A | * | 2/1952 | Sanzenbacher ............. 99/419 |
| 3,587,123 | A | * | 6/1971 | O'Boyle ..................... 114/362 |
| 4,497,413 | A | * | 2/1985 | Tocci .......................... 211/202 |
| 4,982,525 | A | * | 1/1991 | Miller ......................... 43/105 |
| 2004/0089218 | A1 | * | 5/2004 | Cannon ...................... 114/343 |

* cited by examiner

*Primary Examiner*—Stephen Avila
(74) *Attorney, Agent, or Firm*—John Smith-Hill; Smith-Hill and Bedell

(57) ABSTRACT

A rack for receiving and holding a crab pot includes a first plurality of bars and a second plurality of bars. Each bar in the first plurality is linked to each bar in the second plurality of bars to form a generally planar frame. Both ends of each bar in the first plurality and one end of each bar in the second plurality are provided with retaining members that project to a first side of the generally planar frame An engagement member which projects to an opposite second side of the generally planar frame is also provided on each bar.

12 Claims, 3 Drawing Sheets

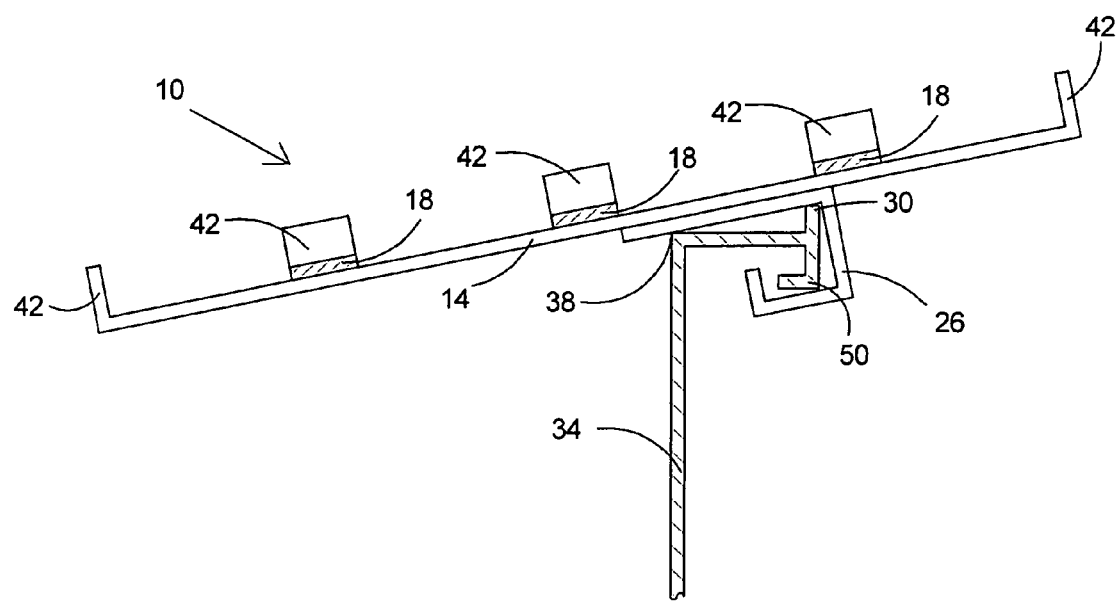

CRAB POT RACK FOR REMOVABLE INSTALLATION ON A BOAT

BACKGROUND OF THE INVENTION

Crabs are caught using pots that are typically about 3 feet in diameter, about 10 inches high and are made of steel bars with a mesh covering. Appropriate bait is placed in the crab pot and the pot is lowered from a boat onto the seabed. Crabs enter the pot and are trapped. The pot is then raised from the seabed in order to remove the crabs. During the pot's time on the seabed, the pot often collects weeds and other debris in addition to the desired crabs and accordingly, after being lifted from the water, the pot typically must be balanced on the rail of the boat while the crabs, weed and debris are removed from the pot before placing the pot in the boat. Balancing the pot on the rail of the boat is awkward and unsafe, as a fisherman will normally have to hold the pot with one hand and use only one hand to clean the pot and remove the crabs.

SUMMARY OF THE INVENTION

An apparatus for receiving and holding a crab pot while removably mounted to a boat, the apparatus comprising a first plurality of bars, parallel to one another, each having first and second opposing ends, and each provided at each end with a retaining member, and a second plurality of bars, parallel to one another, each being linked to each bar in the first plurality of bars to form a generally planar frame, each having first and second opposing ends, each provided at its first end with a retaining member, and each provided with an engagement member spaced from the first end, wherein the retaining members project to a first side of the generally planar frame and the engagement members project to an opposite second side of the generally planar frame.

BRIEF DESCRIPTION OF THE DRAWINGS

For a better understanding of the invention, and to show how the same may be carried into effect, reference will now be made, by way of example, to the accompanying drawings, in which FIG. 3 is a cross-sectional view of a crab pot rack embodying the present invention mounted to the gunwale of a boat.

DETAILED DESCRIPTION

Figure 1A:
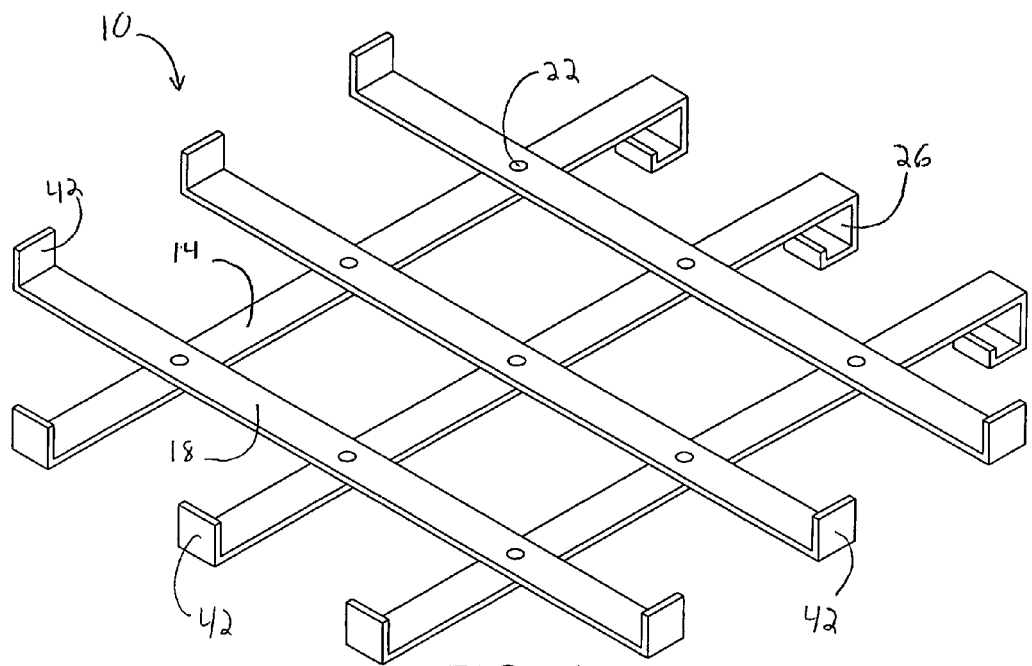
FIG. 1A is a perspective view of a crab pot rack in an open position and embodying the present invention.
Figure 1B:
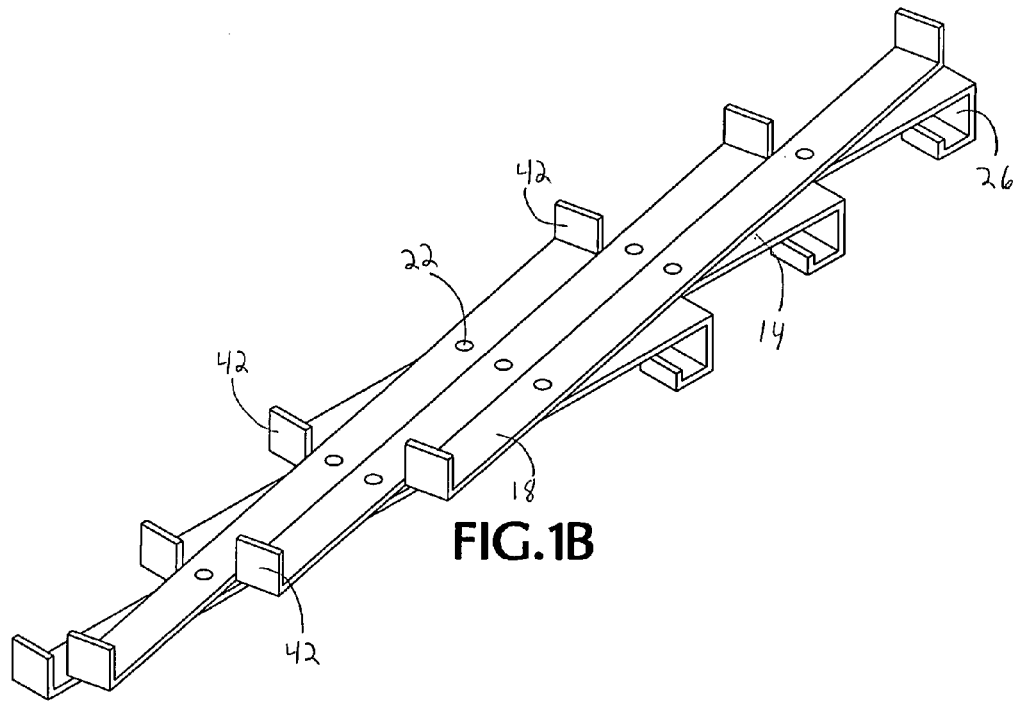
FIG. 1B is a perspective view of the crab pot rack of FIG. 1A in a closed position.

Referring to FIGS. 1A and 1B, the illustrated crab pot rack 10 is formed from a first set of bars 14 and a second set of bars 18. The sets of bars 14, 18 are linked together in a grid by rivets 22 to form a parallelogram linkage that allows the crab pot rack 10 to fold between an open position (shown in FIG. 1A), for mounting to the gunwale of a boat and receiving a crab pot, and a closed position (shown in FIG. 1B), for easy storage when the crab pot rack 10 is not in use. In the open position, the bars 14 are substantially perpendicular to the bars 18, whereas in the closed position, the bars 14 are substantially parallel to the bars 18, i.e. as close to parallel as permitted by the configuration of the components of the rack.

Figure 2:
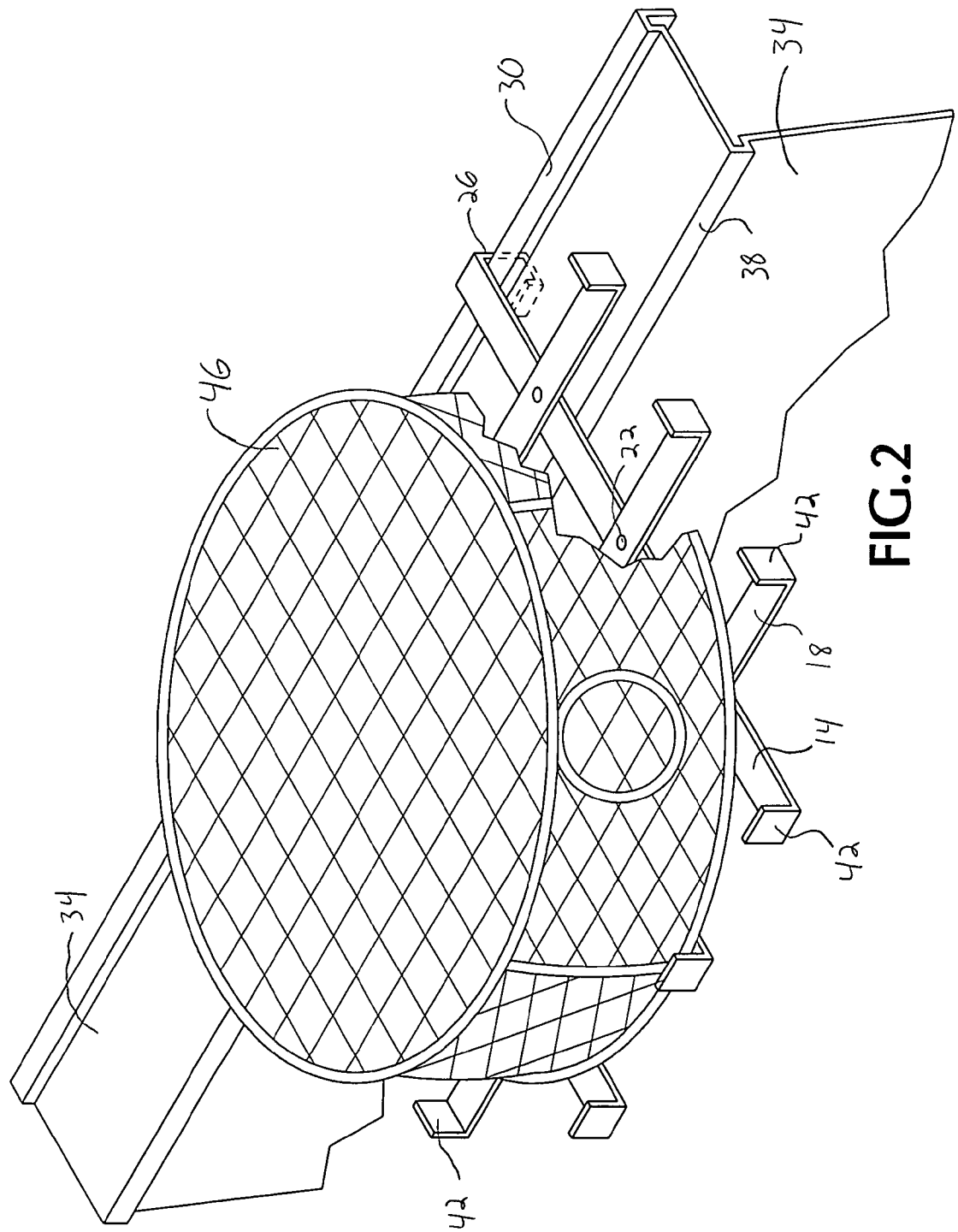
FIG. 2 is a perspective view of the crab pot rack of FIG. 1A mounted to the gunwale of a boat with a partial cut-away view showing how the gunwale supports the crab pot rack.

Each bar 14 is provided with a hook 26 to allow the crab pot rack 10 to be releasably mounted to the inner edge 30 of a boat's gunwale 34 (FIG. 2). The weight of the crab pot rack 10 is supported by the inner edge 30 of the gunwale 34 via the hooks 26 and by an opposing exterior edge 38 of the gunwale 34 via the bars 14. The configuration of the hooks 26 will vary depending on the configuration of the gunwale 34 that the crab pot rack 10 is to be mounted on, as the hooks 26 must fit around the inner edge 30 in order to support the weight of the rack 10 and anything resting on the rack. The opposite end of each bar 14 and both ends of each bar 18 are provided with upturned lip elements 42 substantially perpendicular to the bars 14,18 to prevent anything, such as a crab pot 46, resting on the crab pot rack 10 from sliding off the bars as the boat moves.

The rack is sized to accommodate a load that is 18–36 inches in diameter, preferably 24–32 inches in diameter, and weighs up to 50 lbs.

In another embodiment of the invention, the exterior edge of the gunwale, to which the crab pot rack is mounted, is not suitable for supporting the crab pot rack, e.g. due to a significant downward slope from the interior edge to the exterior edge, and therefore struts are employed in addition to the hooks to support the weight of the crab pot rack. The struts are pivotally attached to the bars such that, when the crap pot rack is in the open position the struts are held away from the bars at an acute angle, e.g. by collapsible braces, whereas in the closed position the struts are substantially parallel to the longitudinal bars. When the crab pot rack is in use, the struts rest against the hull to support the weight of the crab pot rack.

In operation, when a user wishes to raise a crab pot from the seabed to a boat, the user would unfold the crab pot rack to the open position and hook the hooks under the gunwale of the boat and rest the rack on the outer edge of the gunwale so that the frame cantilevers outwardly from the boat over the water. The user would then raise the crab pot to the surface, lift the crab pot from the water, and place the crab pot onto the crab pot rack. Water and debris may then drain from the crab pot, between the bars, and back into the water. The user may then use both hands to open the crab pot and remove any crabs that have been caught, as well as any debris that did not wash away while the crab pot was draining.

In a preferred embodiment of the invention, the crab pot rack is made from stainless steel. Alternatively, the crab pot rack may be made from any other suitable material, such as another metal or heavy-duty synthetic polymer material.

It will be appreciated that the invention is not restricted to the particular embodiment that has been described, and that variations may be made therein without departing from the scope of the invention as defined in the appended claims and equivalents thereof. For example, it will be appreciated that while the upturned lip elements 42, which surround three sides of the crab pot rack 10, are illustrated as being formed by bends in the bars, a discrete component could be attached to the bars to serve an equivalent purpose. The specific configuration and placement of the hooks will vary depending on the cross section of the gunwale that the crab pot rack is designed to be mounted on. For instance, although shown in FIGS. 1A, 1B and 2 as being placed at the ends of the bars 14, the hooks may be placed at any desired point inboard of the bar's center of gravity, as shown in FIG. 3. In this case, the outer edge 38 of the gunwale 34 is close to the center of gravity of the crab pot rack 10 and accordingly the force applied by the hook 26 to the lower inner edge 50 of the gunwale 34 is less than in the case of the embodiment shown in FIGS. 1A, 1B and 2. The length of the first and second sets of bars will vary depending on the size of the crab pots that the crab pot rack is designed to receive.

Unless the context indicates otherwise, a reference in a claim to the number of instances of an element, be it a reference to one instance or more than one instance, requires at least the stated number of instances but is not intended to exclude from the scope of the claim a structure having more instances of that element than stated.

What is claimed is:

1. An apparatus for receiving and holding a crab pot while removably mounted to a boat, the apparatus comprising:
   a first plurality of bars, parallel to one another, each having first and second opposing ends, and each provided at each end with a retaining member, and
   a second plurality of bars, parallel to one another, each being pivotally linked to each bar in said first plurality of bars to form a generally planar frame, each having first and second opposing ends, each provided at its first end with a retaining member, and each provided with an engagement member spaced from said first end,
   wherein said retaining members project to a first side of said generally planar frame and said engagement members project to an opposite second side of said generally planar frame, and wherein said first plurality of bars is pivotally movable relative to the second plurality of parallel bars such that said generally planar frame can be arranged in a functional configuration, in which said first plurality of bars is substantially perpendicular to said second plurality of bars, and a storable configuration, in which said first plurality of bars is substantially parallel to said second plurality of parallel bars.

2. An apparatus according to claim 1, wherein said first and second pluralities of bars are made from metal.

3. An apparatus according to claim 2, wherein said first and second pluralities of bars are made from stainless steel.

4. An apparatus according to claim 1, wherein said first and second pluralities of bars are made from synthetic polymer material.

5. An apparatus according to claim 1, wherein each bar of said second plurality is provided at its second end with a retaining member projecting to said first side of said generally planar frame.

6. An apparatus according to claim 1, wherein each bar of said second plurality has a center of gravity between said first end and said second end and said engagement member is placed between said center of gravity and said second end.

7. An apparatus according to claim 1, wherein said engagement members are provided at said second end of each of said second plurality of bars.

8. In combination, a boat and a removable crab pot rack, the boat having a gunwale, the gunwale having an inner edge and an outer edge and the crab pot rack being releasably engageable with said gunwale and comprising:
   a first plurality of bars, parallel to one another and each having first and second opposing ends and each provided at each end with a retaining member, and
   a second plurality of bars, parallel to one another, each being pivotally linked to each bar in said first plurality of bars to form a generally planar frame, each having first and second opposing ends, each provided at its first end with a retaining member, and each provided with an engagement member spaced from said first end,
   wherein said retaining members project to a first side of said generally planar frame and said engagement members project to an opposite second side of said generally planar frame,
   wherein said engagement members are configured to releasably engage said inner edge of said gunwale, and when said crab pot rack is engaged with said gunwale the weight of the crab pot rack is at least partially supported by said gunwale,
   and wherein said first plurality of bars is pivotally movable relative to the second plurality of parallel bars such that said generally planar frame can be arranged in a functional configuration, in which said first plurality of bars is substantially perpendicular to said second plurality of bars, and a storable configuration, in which said first plurality of bars is substantially parallel to said second plurality of parallel bars.

9. A combination according to claim 8, wherein the weight of said crab pot rack is partially supported by the inner edge of said gunwale via the engagement members and partially supported by the outer edge of said gunwale via the first plurality of bars.

10. In combination, a boat and a crab pot rack, the boat having a hull, a gunwale extending inboard of the hull in cantilever fashion at an upper edge of the hull, the gunwale having an inner edge and an outer edge and the crab pot rack being releasably engageable with said gunwale and comprising:
   a first plurality of bars, parallel to one another and each having first and second opposing ends and each provided at each end with a retaining member, and
   a second plurality of bars, parallel to one another, each being pivotally linked to each bar in said first plurality of bars to form a generally planar frame, each having first and second opposing ends, each provided at its first end with a retaining member, and each provided with a hook-shaped engagement member spaced from said first end,
   wherein said retaining members project to a first side of said generally planar frame and said engagement members project to an opposite second side of said generally planar frame,
   wherein each engagement member includes a first segment that extends from the bar to said second side of said generally planar frame, a second segment that extends from the first segment towards the first end of the bar and substantially parallel to the bar, and a third segment that extends from the second segment towards the bar, whereby the engagement member is configured to releasably engage said inner edge of said gunwale, and when said crab pot rack is engaged with said gunwale the weight of the crab pot rack is at least partially supported by said gunwale,
   and wherein said first plurality of bars is pivotally movable relative to the second plurality of parallel bars such that said generally planar frame can be arranged in a functional configuration, in which said first plurality of bars is substantially perpendicular to said second plurality of bars, and a storable configuration, in which said first plurality of bars is substantially parallel to said second plurality of parallel bars,
   and wherein the engagement members can be engaged with the gunwale of the boat so that the bars of the first plurality engage the outer edge of the gunwale intermediate their ends and the second segment of the engagement member engages the inner edge of the gunwale.

11. A combination according to claim 10, wherein the engagement members are provided at the respective second ends of the bars of the second plurality.

12. A combination according to claim 11, wherein the gunwale has a downwardly extending lip at its inner edge and the engagement members are configured to receive said lip between the first and third segments of each engagement member.

* * * * *